Oct. 11, 1966 W. C. SUSOR 3,278,929

DECODING APPARATUS

Filed Feb. 25, 1963 4 Sheets-Sheet 1

INVENTOR.
WILLIAM C. SUSOR

BY Marshall, Wilson, Click & Yeasting
~attorneys~

INVENTOR.
WILLIAM C. SUSOR
BY
Marshall, Wilson, Click & Yeasting
~attorneys~

Oct. 11, 1966 W. C. SUSOR 3,278,929

DECODING APPARATUS

Filed Feb. 25, 1963 4 Sheets-Sheet 3

INVENTOR.
WILLIAM C. SUSOR

BY
Marshall, Wilson, Click & Yeasting
-attorneys-

Oct. 11, 1966 W. C. SUSOR 3,278,929

DECODING APPARATUS

Filed Feb. 25, 1963 4 Sheets-Sheet 4

INVENTOR
WILLIAM C. SUSOR

BY
Marshall, Wilson, Click & Yeasting
attorneys

United States Patent Office 3,278,929

Patented Oct. 11, 1966

3,278,929

DECODING APPARATUS

William C. Susor, Tremonton, Utah, assignor to Toledo Scale Corporation, Toledo, Ohio, a corporation of Ohio Filed Feb. 25, 1963, Ser. No. 260,447

5 Claims. (Cl. 340—347)

This invention relates to data conversion systems and more particuarly to apparatus for converting data from a non-decimal radix to a decimal radix.

The advantages of performing counting or other arithmetic operations in a non-decimal radix and particularly in the binary form, in computers, condition responsive devices, or other types of fast acting mechanisms is too well known and appreciated to require any further explanation at this time. However, while much attention has been centered upon ways and means of speeding up the arithmetic operations little if any attention has been focused upon apparatus to convert the binary results of the arithmetic or counting operations to their equivalent decimal numbers. The outcome has been that old relay type decoding matrixes still are the order of the day as far as converting systems go. It is to overcome this lag in the decoding apparatus art that this invention is directed.

Accordingly it is an object of this invention to provide an unique decoding apparatus which is capable of converting numbers from a non-decimal base to a decimal base.

It is still another object of this invention to provide a decoding apparatus which utilizes no moving parts therein.

It is a further object to provide a unique decoding apparatus which utilizes selectively actuatable semi-conductor elements to form unique decimal indicating arrangements.

It is still a further object to provide decoding apparatus which is capable of translating binary data or accumulations into their equivalent decimal forms.

In accordance with the above and first briefly described the invention comprises a binary coded decimal counter having a plurality of output leads settable in accordance with the binary information therein, a first, second, and third plurality of semi-conductor type switching devices, each of said devices having two load elements and a control element, the load elements of selective ones of each of said first, second and third plurality of switching devices operatively connected in series circuit arrangement across a source of operating potential, and means including the output leads of said binary counters to selectively actuate the control elements of predetermined ones of said switching devices in accordance with the binary number in said counter and thereby indicating the decimal equivalent thereof.

For a complete understanding of my invention reference should be made to the following specification and the accompanying drawings in which like elements are given the same character references and in which.

Figures 1, 4, 8:
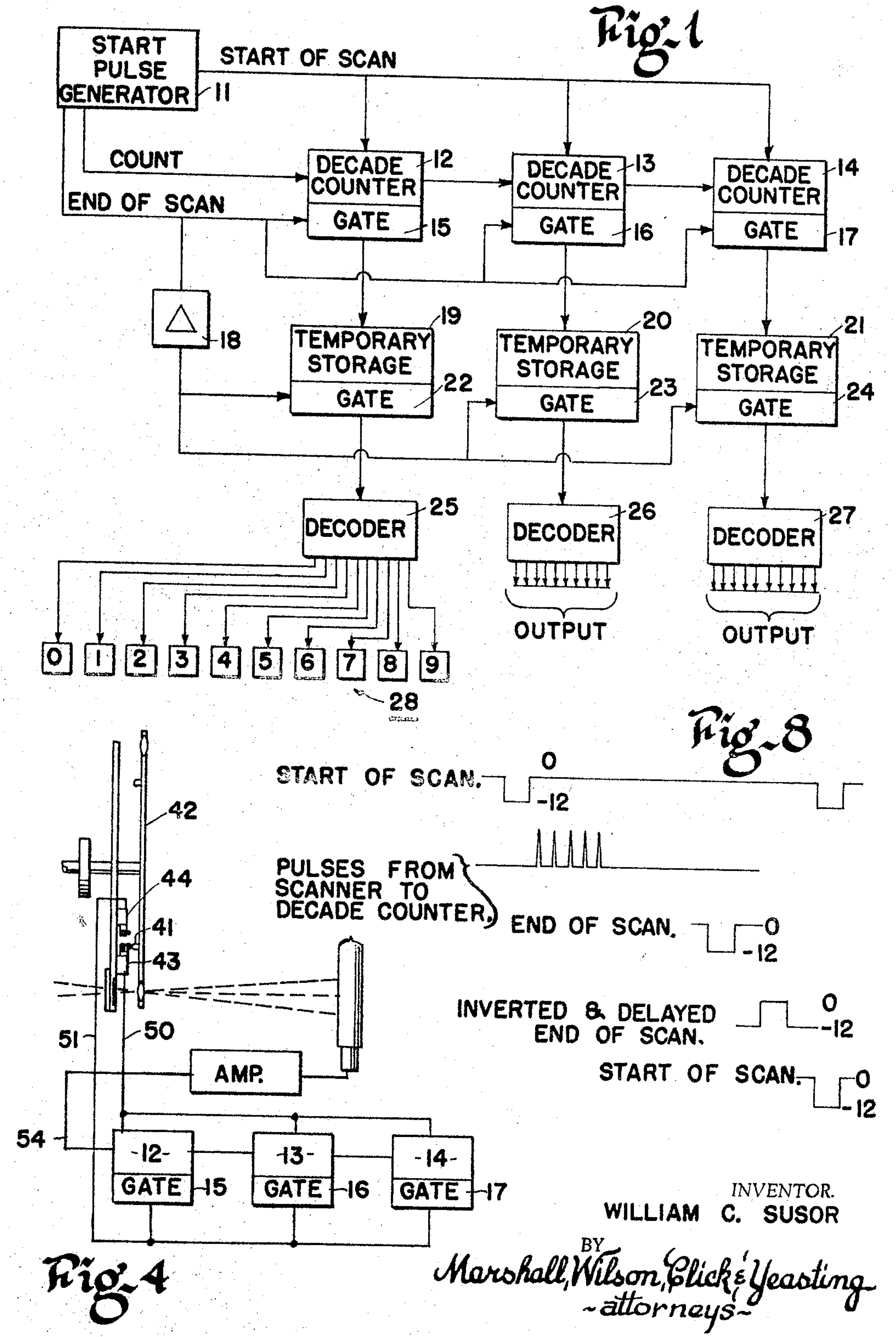
FIG. 1 is a schematic block diagram illustrating the general organization and relationship of the various electronic elements in one embodiment of the invention.
FIG. 4 is a fragmentary side elevation view and illustrates a way by which a start of scan and end of scan pulse may be generated.
FIG. 8 is a timing diagram of the wave shapes which appear at various identified points in the system and illustrates the manner of cooperation of the various electrical components of the system.

Now with reference to the details of the drawings illustrating the preferred embodiment of the invention and first referring to FIG. 1, whereat there is shown by the numeral 11, a pulse generating means which in addition to supplying the data that is to be accumulated in the binary coded decimal counters 12, 13 and 14, also supplies start and end of scan signals. This will be discussed in greater detail hereinafter. The decade counters have as an integral feature thereof an individual output gating system, 15–17, which prevents the reading out of the accumulated data until a predetermined time. Also as shown in FIG. 1 temporary storage circuitry 19–21 may be provided for each decade counter to permit the temporary storage of a previous accumulation therein while the pulse generator is supplying new data thereto. Each temporary storage circuit may also have an associated gate to control the reading out of information, however this may vary with particular application. Operably connected to storage circuits 19–21 are individual decoders 25–27 which function to decode the binary data accumulated by the decade counters into an equivalent decimal form. Lastly, output means such as shown by the numeral 28, one such means being provided for each decoder, unless a decimal information entry device such as an adding machine or typewriter is utilized whereupon a single device may be employed, are used to display in decimal notation the results of the accumulation by the binary counters.

Figure 2:
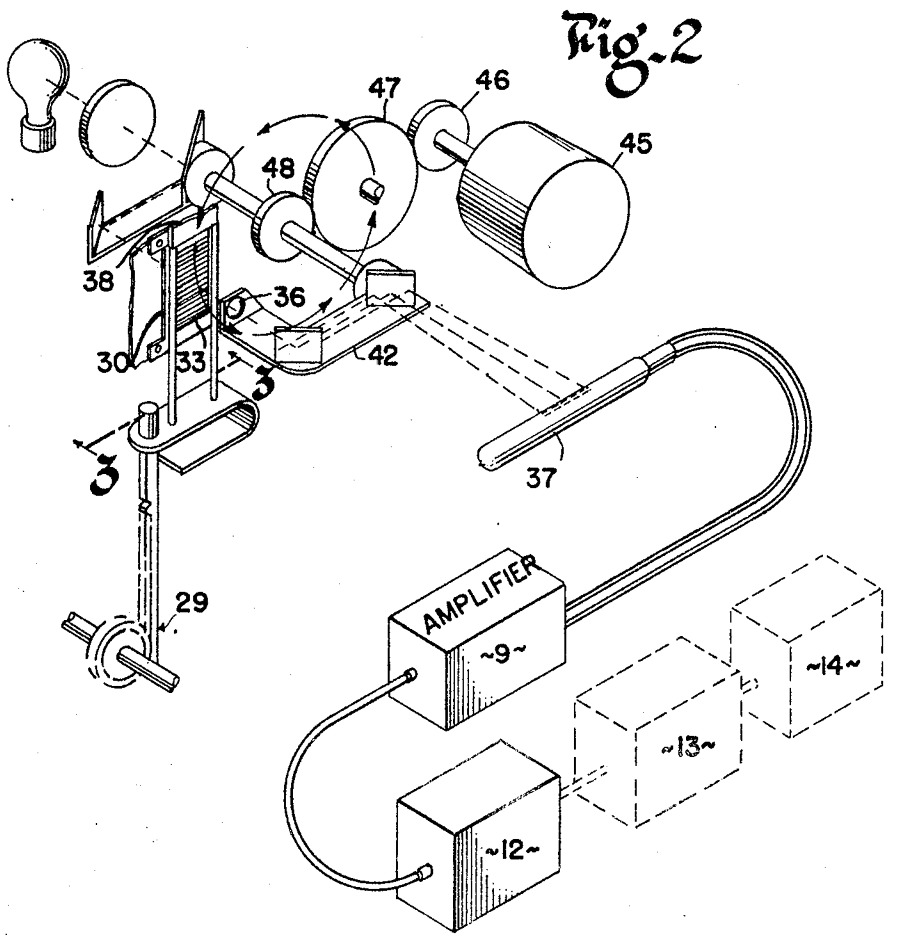
FIG. 2 is a perspective view showing one form of a pulse generating device suitable for use with the invention to supply the binary data to be counted in the binary coded decimal counters.
Figure 3:
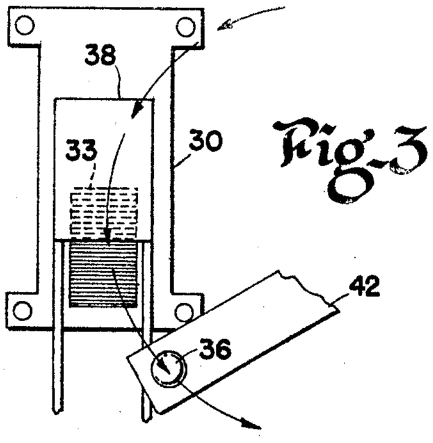
FIG. 3 is a fragmentary schematic view taken along the line 3—3 of FIG. 2 and showing the fixed chart and movable mask of FIG. 2 in greater detail.

The data pulse generating means employed in this particular embodiment is illustrated in FIG. 2, however it should be emphasized that the signals may be supplied by any of the many available sources such as pulses generated by electronic computers, information read off of magnetic tape, punched card information, etc. The scanning device as shown in FIGS. 2–4 forms the subject matter of Patent 2,938,126, issued to C. E. Adler and of common ownership herewith, and to which reference should be made for a more detailed explanation. However for purposes of clarity and understanding a brief outline thereof will now be made. As shown in FIG. 2 the condition responsive member whose position must be read is a rack 29 of a measuring instrument (not shown), and it is mounted for movement in response to the condition being measured by the measuring instrument. The measuring instrument might, for example, be a weighing scale the mechanism of which moves the rack 29 upwardly in response to a load being placed on the load receiver of the scale and which moves the rack downwardly when such load is removed from the scale.

The position of rack 29 is indicated relative to a stationary graduated chart 30, see also FIG. 3 for greater detail. Chart 30 is in turn provided with a plurality of transparent lines 33 corresponding to the ordinary indicia or numerals used to indicate the magnitude of the condition being measured by the measuring instrument, in this case a scale, to which the rack 29 is responsive. If the instrument is a weighing scale there may be one transparent line 33 for each ounce of weight under measurement.

The position of the pair of relatively movable members, rack 29 and the stationary graduated chart 30, is automatically and accurately read by means which include an optical projection lens 36 that is movable along the chart 30 so that the field of view of the lens scans the chart, and further is adapted to sweep projected images of chart graduations or lines 33 across a stationary photoelectric cell 37. The path of movement of the projection lens 36 is indicated by the arrows in FIGS. 2 and 3.

As explained in the hereinabove mentioned Adler patent a mask 38 is provided for attachment to, and is movable with, rack 29. The mask 38 is of a length greater than the graduated portion of the chart 30 and is mounted so as to completely expose the chart when in its uppermost position. The mask 38 occludes a portion of the chart in accordance with the position of rack 29, and thereby interrupts the projection of images from the chart 30 to the photoelectric cell during a portion of the movement of the projection lens 36. Since rack 29 and its attached mask 38 are responsive to uncover some or all of the lines 33 of chart 30 in accordance with the load on the scale, the number of images of the lines 33 swept across the photoelectric cell 37 during each scan of the chart 30 by projection lens 36 will be proportional to the load on the weighing scale.

In the usual manner the bursts of light passed onto the photoelectric cell 37 by the chart scanning lens 36 are converted thereby to a series of electrical impulses. These electrical pulses may then be shaped or amplified by any of the many well-known means to produce signals of proper characteristic for the driving of the electronic counters 12–14. Each sweep of the projection lens 36 along the chart results in a train of electrical impulses in which the number of pulses are proportional to the displacement of the mask 38 from its zero position, or that position of the mask at which it just occludes all of the lines 33 on the chart 30.

As shown in FIG. 2 by the numerals 45–48, and as explained in the above-mentioned Adler patent, driving means are provided to rotate the scanning lens 36 in an arcuate path generally parallel to the plane of the chart 30, there being a portion of said path in proximity to the chart. Furthermore, as more fully explained in the Adler patent and shown in FIG. 4, switching means may be provided to generate a start of scan and end of scan signal respectively just prior to, and immediately after a scanning of chart 30 by lens 36. As shown in FIG. 4 just prior to the time that lens 36 begins to traverse the graduated chart 30 a cam 41 carried by arm 42 of the lens carrier closes the contacts of switch 43. Switch 43 is cable connected by leads 50 to the counters 12–14 and will be effective upon its closing to reset the counters to their initial states immediately prior to the generation of any pulses. Immediately after the traversal of chart 30 by lens 36, cam 41 will be operatively positioned to close the contacts of switch 44. Switch 44 is cable connected to output gates 15–17, the associated gates of decade counters 12–14, and accordingly upon the closing of switch 44 a pulse will be supplied to the gating circuitry to permit a read out of the decade counters.

The binary coded decimal counters and their associated gating circuitry, represented by numerals 12–17 in FIG. 1, will now be described.

Figures 5, 6:
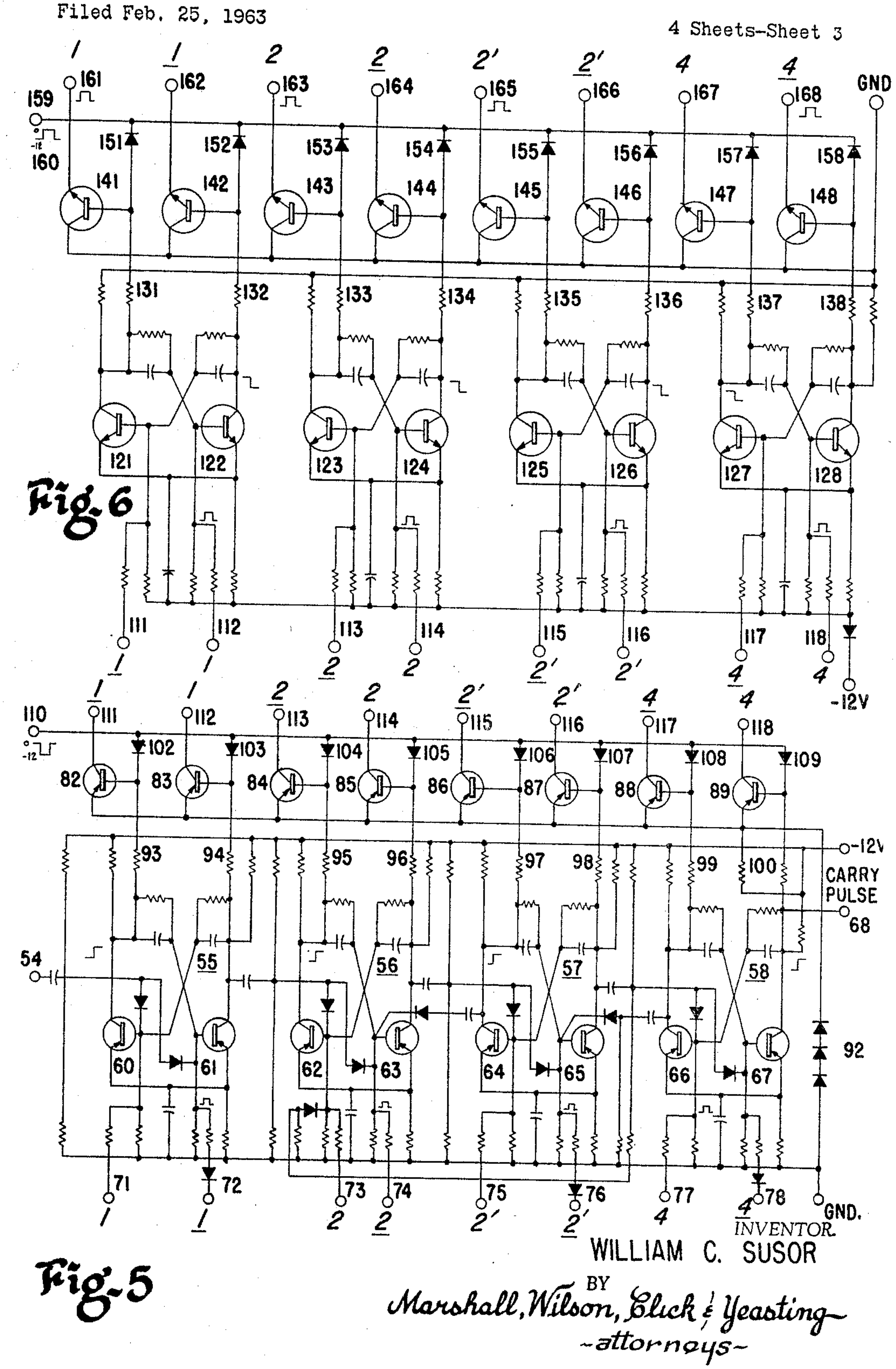
FIG. 5 is a schematic wiring diagram of one binary coded decimal counter along with its associated gating circuitry suitable for use in this invention.
FIG. 6 is a schematic wiring diagram of a typical temporary memory unit along with associated gating circuitry which may be employed in this invention.

FIG. 5 shows one decade of an electronic counter which is suitable for use in this system, the other decades being of similar design. The counter comprises four stages of binary flip-flops of bistable multivibrators, 55–58, which are connected to operate in sequence, and are provided with certain feedback connections so that ten input pulses applied to input lead 54 will result in one complete cycle of operation, including the generation of a carry pulse at terminal 68. Accordingly the internal code of the counter is 1–2–2′–4, that is the first flip-flop if on will indicate a decimal ONE and a NOT ONE, if off, the second a decimal TWO or a NOT TWO, the third a decimal TWO or a NOT TWO, and the fourth a decimal FOUR or a NOT FOUR. In this manner any decimal number from zero through ten can be represented depending upon the combination of the four flip-flops activated.

For example if only the first and second flip-flops were on the number would be a three, or if all were on the count would be a nine. The following chart indicates the decimal count for various combinations of conducting flip-flops in the counter; where X indicates a conducting transistor of a flip-flop and O indicates a non-conducting transistor of a flip-flop.

CHART A

| Decimal Count | FF 55 | | FF 56 | | FF 57 | | FF 58 | |
|---|---|---|---|---|---|---|---|---|
| | 1 | $\underline{1}$ | 2 | $\underline{2}$ | 2′ | $\underline{2'}$ | 4 | $\underline{4}$ |
| 1 | X | O | O | X | O | X | O | X |
| 2 | O | X | X | O | O | X | O | X |
| 3 | X | O | X | O | O | X | O | X |
| 4 | O | X | X | O | X | O | O | X |
| 5 | X | O | X | O | X | O | O | X |
| 6 | O | X | O | X | X | O | X | O |
| 7 | X | O | O | X | X | O | X | O |
| 8 | O | X | X | O | X | O | X | O |
| 9 | X | O | X | O | X | O | X | O |
| 0 | O | X | O | X | O | X | O | X |

It is of course possible to choose different combinations of conducting and non-conducting FF's to indicate the various decimal counts.

Leads 71–78 are provided to enable the counter to be preset to any original count desired and, as is the usual case, if the counter is to start off at zero count the reset pulse will be applied to terminals 72, 74, 76 and 78 to place each of the righthand transistors of the flip-flops into their conducting states. It is of course to be understood that the carry pulse lead of the units counter 12 is to be operably connected to the input lead of the tens counter 13, and the carry lead of counter 13 will be coupled to the input of the hundreds counter 14, etc. For a more detailed explanation of transistor type binary coded decimal counters reference is made to any of the many available texts which adequately handle the topic.

In addition, as shown at the upper portion of FIG. 5 decade counter 12 is provided with gating circuitry 15. The purpose of the gating circuitry is to prevent the information accumulated by the counters from being read out therefrom prior to the completion of a full scan operation by the pulse generating system. Upon the completion of a pulse generating cycle all of the information accumulated in the counters may simultaneously be transferred from the counters directly to the decoding apparatus, or in the alternative it may be applied through temporary storage means to the decoding apparatus. As shown in FIG. 5 each of the gating transistors 82 through 89 are of the PNP variety and have their emitters connected to the junction point of series connected crystal diodes 92 and a biasing resistor. In turn the biasing arrangement is connected across a −12 volt supply to thereby place the emitters at about −1.5 volts. The base electrodes of each of the gating transistors are connected by way of resistors 93–100 to the collectors of their associated counter transistors 60–67 respectively. Furthermore, the gating signal 101, which is generated as stated above by the closing of switch 44 and which, as indicated in FIG. 8 and redrawn for purposes of understanding next to input terminal 110 is of 0 to −12 volt magnitude, is applied to each of the base electrodes of gating transistors 82–89 by way of crystal diodes 102–109. The collectors, 111–118, of each of the respective gating transistors, 82–89, are connected by way of appropriate resistors to a −12 volts. It should be noted that the collectors 111–118, as shown in FIG. 5, are connected to similarly labeled points in FIG. 6, whereat is shown the plurality of collector resistors connected to the −12 volts supply for the gating transistors 82–89 of FIG. 5.

Normally therefore in the absence of a −12 volt gating impulse being applied to the plate of each of the diodes 102–109 each of the transistors 82–89 will be cut off and the output of the associated collectors will be at a −12 volts. This is so irrespective of the voltage at the associated collectors of the counter transistor 60–67, for since the plates of diodes 102–109 will be at approximately ground potential it follows that the bases of gating transistors 82–89, to which the cathodes of the said diodes are connected, will be at approximately 0 volts. That this is the case is clear since if the collectors of any of the counter transistors are at a −12 volts, to thereby indicate a nonconduction thereof, each of the associated diodes 102–109 will be forwardly biased and the bases of the related gating transistors will be at approximately 0 volts. Should the collectors of any of the counter transistors be at approximately 0 volts, indicating a conducting condition, the bases of the associated gating transistors will again be at approximately 0 volts. Accordingly, since the emitters are at approximately −1.5 volts, and therefore negative with respect to the bases, it is clear that the PNP type transistors 82–89 will all be cut off.

However, upon the occurrence of the end of scan pulse, lead 110 will drop in potential to a −12 volt level, and accordingly the plates of each of diodes 102–109 will be at −12 volts. Therefore, all of the counter transistors which have their collectors at a −12 volts to thereby indicate an off state will be able to drive the bases of their associated gating transistors negative to permit conduction thereof. On the other hand the counter transistors whose collectors are at 0 volts, thus indicating conduction, will still maintain the bases of their associated gating transistors at approximately 0 volts to prevent conduction thereof. It should be obvious that this is contrary to that which is desired, for it is desired that the counter transistor which is conducting pass a signal through its associated gating transistor to the storage circiutry of FIG. 6. This effect can be simulated by a relabeling of the output leads at the gate transistors to indicate the desired binary notations.

FIG. 6 shows in schematic wiring diagram form the temporary stored circuitry used in this invention. As shown thereat the circuitry consists basically of four bistable multivibrators, made up of transistors 121–128, with each transistor of the flip-flop having individual gating transistors 141–148. As is well-known, bistable multivibrators have two generally stable states of conduction. The stable states being defined by conduction in only one transistor with the other one being cutoff. The flip-flop will remain, or remember which state it is set to, by remaining in its stable state until another pulse of information comes along to cut off the then conducting transistor and to turn on the transistor which had previously been cut off. Accordingly a reliable memory system will have resulted.

There are of course many methods of applying the triggering pulses to the flip-flops to accomplish a triggering thereof, in this particular application the triggering is accomplished by pulsing the bases of the selected ones of the NPN transistors 121–128 with positive going pulses. In this particular example, as explained above, a portion of each of the collector resistors for gating transistors 82–89 is placed in circuit with the base electrode of the flip-flop transistors 121–128, see FIG. 6. In this manner information can be directly read into the flip-flops from the correspondingly associated counters, for as soon as any of the gate transistors 82–89 are turned on, and which will in turn be dependent upon the status of the counter flip-flops at the time of application of the gating pulse, a positive going pulse will be generated across the collector resistors thereof. Therefore, since the collector resistors of gates 82–89 are individually in circuit with individual ones of flip-flop transistors 121–128, the transistors in the temporary storage unit will immediately assume the correct status as indicated by the counter.

Similarly to the gating arrangement provided for the counter circuitry of FIG. 5, gating transistors 141–148 are also provided for the temporary storage flip-flops, see the top portion of FIG. 6. As shown in FIG. 6 each of the gating transistors 141–148 is of NPN variety, and the bases of each are resistor connected to the collectors of their corresponding flip-flop transistors 121–128. Furthermore, the bases of transistors 141–158 are individually connected by way of crystal diodes 151–158 to lead 159, over which a gating signal is applied. The gating signal 160, derived as will be explained below by inverting and delaying the end of scan signal, is a pulse which rises from a −12 volt level to approximately 0 volts, as shown adjacent lead 149 and in timing relationship to the other pulses in FIG. 8. Upon the occurrence of the gating signal each of the gating transistors associated with flip-flop storage transistors which are in a non-conducting state will be turned on. However, the gating transistors associated with storage transistors that are in a conducting state will remain cut off. A change in binary designation as shown adjacent the gating output leads to correct for this, in a manner similar to that of the gating arrangement for FIG. 5 and serving the same purpose, has also been made.

Figure 7:
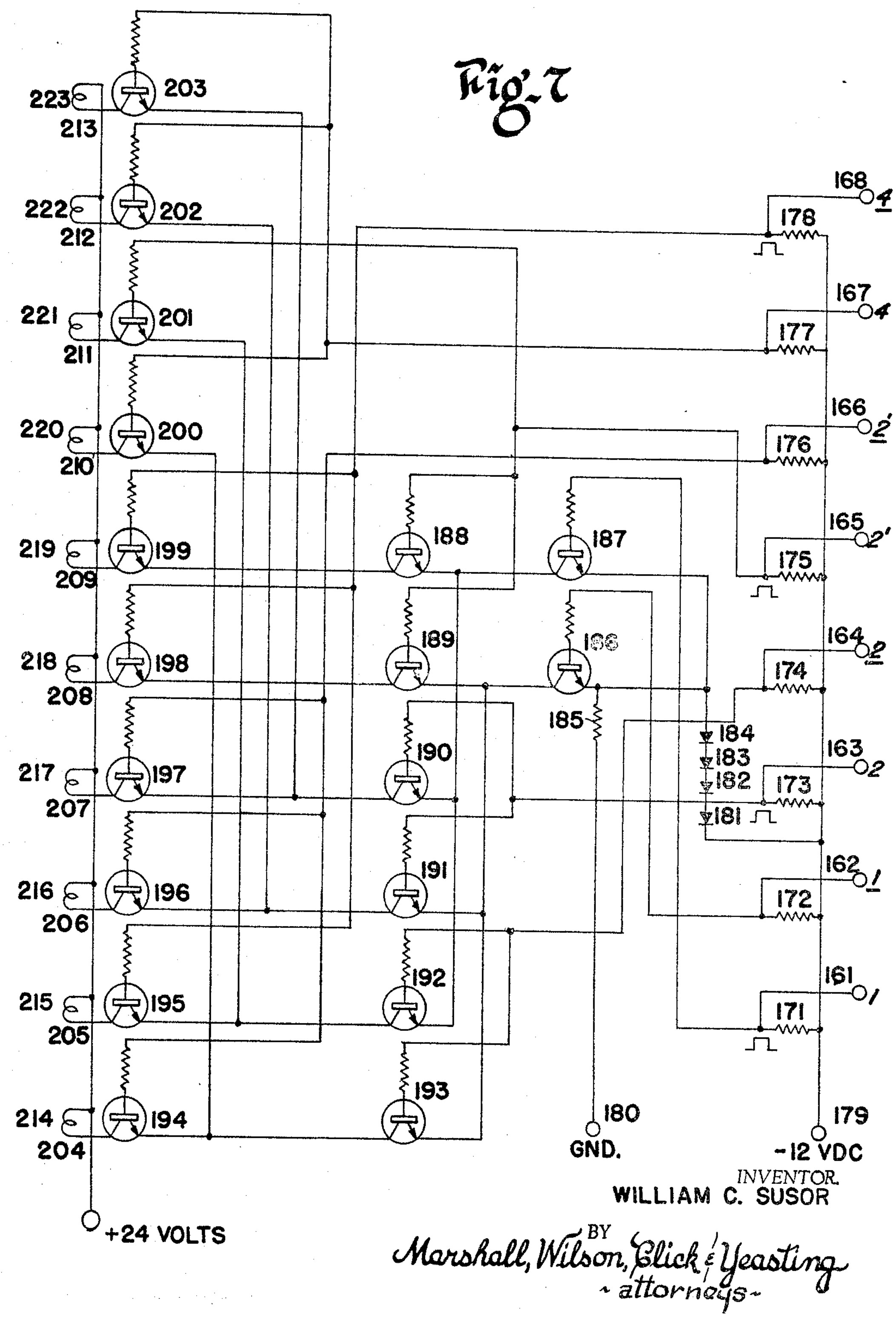
FIG. 7 is a schematic wiring diagram of a decoding network.

As an alternate mode of operation the gating lead 159 may be permanently maintained at a 0 volt level and accordingly the gating transistors 141–148 will always be controlled by the status of the counter transistors so that information as it is transferred into the temporary storage flip-flop will be immediately transferred to the inputs of the decoding apparatus of FIG. 7. The collector resistors 171–178 connected to a −12 volts biasing potential for respective gating transistors 141–148 are shown in FIG. 7.

The circuitry of FIG. 7 indicates in schematic wiring diagram form applicant's unique decoding system. Basically what is shown is a plurality of normally open series circuit paths which have a source of 24 volts applied thereacross. However, since the paths are normally open no current will flow therethrough unless and until the series circuit is completed. As shown in FIG. 7 a biasing voltage of −12 volts being applied over leads 179 and 180 is connected across the series connected resistor 185 and crystal diodes 181–184. The emitters of normally non-conducting transistors 186 and 187 are connected to the junction point of resistor 185 and diode 184. Since the aforementioned diodes 181–184 are connected in a forward biasing direction across the leads 179 and 180 it follows that a current will flow therethrough and accordingly establish a biasing voltage for a first group of transistors 186 and 187 to keep them in a normally cut off state.

The collectors of the first group of transistors 186 and 187 are connected to preselected emitters of the second group of transistors, which is made up of the transistors 188–193. Specifically the collector of transistor 186 is directly connected to the emitter electrodes of transistors 189, 191 and 193, and the collector of transistor 187 is directly connected to the emitter electrode of transistors 188, 190 and 192.

Likewise the collector electrodes of the second group of transistors 188–193 are directly connected to the emitter electrodes of predetermined transistors which make up the third group of transistors for the decoding system. Particularly, as shown in FIG. 7, the collector of transistor 188 is directly connected to the emitter of third group transistor 199, the collector of transistor 189 is directly connected to the emitter of transistor 198 and, the collector of transistor 190 is directly connected to the emitter electrodes of third group transistors 197 and 203, etc. Finally each series path includes one of the filaments of lamps 214–223 which are shown in FIG. 7 to be individually connected from a positive 24 volt supply in circuit with individual ones of collectors of third group transistors 194–203. Therefore, if each of the output lights is said to represent one of the decimal digits 0–9, and for purposes of explanation let us assume that the digits 0–9 are represented respectively by lamps 214–223, it is clear that the decoder output leads will be representative of decimal data.

The function of the base electrode of each of the transistors in each group still remains to be explained as well as connected. Through the connections explained above the three groups of transistors will be formed into ten unique decimal indicating series circuit paths wherein each path is made up of three transistors, one from each group. Also a light is connected from a 24-volt supply to the collector electrode of each of the output transistors for each of the ten series paths. However no current will flow through any of the series paths until the three transistors therein are simultaneously turned on. As shown in FIG. 7 the base electrode of each of the transistors are directly connected to the output resistors 171–178 of the temporary storage gating transistors 141–148. In this manner the positive going signal developed across the output resistors will be supplied to predetermined base electrodes of the decoder transistors in accordance with the decimal coded binary information read out of the temporary storage flip-flops. Accordingly, as marked, lead 161 would represent binary one, lead 162 NOT one, ($\underline{1}$) . . . lead 168 NOT four ($\underline{4}$). Prior to read out time of the storage flip-flops each of the base electrodes of the plurality of decoder transistors will be connected, by way of the shown base resistors and the gating output resistors 171–178, to a −12 volts and accordingly be held in a non-conducting state. However, upon the reading out of the temporary storage flip-flops a −12 to 0 volts signal will be developed across the collector resistors 171–178 in accordance with the information stored therein. Also, since the base electrodes of each of the plurality of the transistors switching elements 186–203 are operably connected to the output resistors 171–178, selective ones thereof will have risen to 0 volts to trigger their transistors into a conducting state. However because of the deliberate interconnections between the plurality of switching devices it is possible for one, and only one, series path to have all three of its transistors turned on for any given binary number read out of the temporary storage. It accordingly follows that since the output of the various binary devices will assume ten different combinations that only one of the ten series circuits paths can be completed for a given one of the binary combinations.

In summary, since each of the decimal digits is comprised of eight different distinct binary signals, four on and four off, as shown in Chart A, the combination of these signals is unique for each of the ten digits of the ten decimal code. Also, since, all eight binary signals for any given decimal digit are supplied to bias the transistor decoder in accordance with their current status, it follows that the transistorized matrix will decode the binary number to complete a signal through only one of the ten unique series paths for any given set of eight binary signals. Furthermore, in each case at least three transistors must be properly biased in order to complete a series circuit path and pass a signal to the output terminal to turn on a light connected thereto.

The output of the decoding apparatus is then fed to appropriate output means in order to record or display in decimal notation the results of the arithmetic computation weighing, accumulation, etc. As shown in FIG. 7 the output of the decoder is used to activate one of the ten indicating lights 214–223. In turn these lights are shown in FIG. 1 to edge light a series of transparent plastic plates 28 which are individually engraved with indicia corresponding to the various digits to be indicated. However while the bank of transparent plastic plates lighted by lamps, which in turn are energized according to the decimal number converted, provides a simple and practical type of output indication any of the many other output means may also be employed.

As shown in FIG. 1 the end of scan pulse is applied to the gating circuits 22–24 of the temporary storage means 19–21 by way of a delayed circuit 18. It is obvious that this delay may vary to suit the cycle of operation desired and accordingly may result in the gating of the information from the temporary memory at any time varying from concurrently with the occurrence of the end of scan pulse, as developed by switch 44, up until the start of scan pulse of the next immediate occurring scan. Also it is clear that if a delay is used that any of the many known ways and circuits for accomplishing a delay may be utilized.

Further, it should be recalled, and as shown in waveform of FIG. 8, that the end of scan signal is a 0 to −12 pulse, but that a −12 to 0 signal is required to enable the gating transistor which controls the read out of information from the temporary memory of FIG. 6. Accordingly the end of scan pulse will have to be inverted by appropriate inversion circuitry which can be included in the delay circuit indicated by numeral 18 of FIG. 1.

THEORY OF OPERATION

Immediately prior to lens 36 starting its scan of chart 30 a start of scan pulse will be generated by the closing of switch 43 by cam 41. The start of scan pulse is a negative going pulse of −12 volts, see FIG. 8. As shown in FIG. 1 the start signal will be applied to each of the decade counters 12–14 to reset them. Specifically the −12 volts start of scan pulse will be connected to leads 72, 74, 76 and 78 of the decade counter as shown in FIG. 5, the NOT sides of flip-flops 55–58, and accordingly place transistors 61, 63, 65 and 67 in a conducting state. It will be recalled, see Chart A, that this places the counter 12 in a 0 indicating state. Furthermore, for purposes of illustration, let us assume that only five lines will be exposed by mask 38 in response to a weight applied to the scale. Therefore only the units indicating counter 12, of which FIG. 5 is an example, will be operable.

As the lens 36 scans the indicia 33 five bursts of light will be sensed by photoelectric cell 37. Photocell 37 will convert the five bursts of light into five pulses. The pulses may then be applied to an appropriate amplifier, 9, see FIG. 2, for amplification and shaping into pulses which are capable of triggering decade counters 12–14. The pulses will then be applied by cable to the input lead 54 of unit decade counter 12, see FIG. 5. The five pulses will then be counted in the well-known manner by the counter until, in agreement with Chart A, transistor 60 of flip-flop 55, transistor 62 of flip-flop 56, and transistor 64 of flip-flop 57 and transistor 67 of flip-flop 58 will each be in their conducting states. Of course, each of the other transistors of the flip-flops will be non-conducting. As each of the last mentioned transistors of the flip-flops are turned on the collectors thereof will rise to approximately 0 volts from a normal non-conductive level of −12 volts. This rise in voltage diagrammatically shown proximate the collector leads in FIG. 5.

The next thing to occur, as lens carrier arm 15 completes its scan of chart 30, is the closing of switch 44 by cam 41, see FIG. 4. As shown in FIG. 8 the closing of switch 44 results in a 0 to −12 volts end of scan signal being generated. The end of scan signal is shown in FIG. 1 being applied simultaneously to each of gating networks 15, 16, and 17. However, since in this example we are assuming that only the units counter 12 has a count stored therein we shall confine our discussion to the associated gating circuitry therefore. The gating circuitry associated with counter 12 is shown in the upper portion of FIG. 5, and as was explained heretofore comprises a normally non-conducting PNP type transistor for each transistor of the counter. Also as was explained in detail above upon the application of the −12 volts end of scan pulse to the diodes 102–109, by way of lead 110, the gating transistors associated with the then non-conducting counter transistors will be enabled while the gates associated with the then conducting counter transistors will be held cut off. Accordingly in line with my example of the numeral 5 being stored in the decade counter, gate transistors 82, 84, 86 and 89 will be off and gate transistors 83, 85, 87 and 88 will be turned on. The result of the above gating operation is the generation of a −12 to 0 volt signal at the collector resistors of the enabled transistor gates, see the waveforms at the resistors connected to terminals labeled 112, 114, 116 and 117 of FIG. 6. In this manner the result of the immediately prior scanning operation has been transferred into temporary storage, where the count will be stored and eventually displayed at the system output means in decimal form while a new count of the current scanning operation will be accumulated in the counters.

Upon the application of a gating signal to the gating transistors of each decade counter, input signals will be applied to the storage flip-flops associated therewith in accordance with the number accumulated in the counter. Accordingly, upon the occurrence of the −12 to 0 volt signals, as shown in FIG. 6, at the base electrodes of transistors 122, 124, 126 and 127 they will go into their conductive states, whereas the remaining transistors will, of course, be held in their cut off states. Upon each of the last mentioned transistors assuming their conducting states the voltage at the collector resistors thereof would drop from a normal non-conducting level of 0 volts to a conducting level of −12 volts. The voltage levels of the non-conducting transistors will remain at 0 volts.

Similarly to the operation explained above in connection with the description of the gating circuitry of FIG. 6, the application of a −12 to 0 volt gating pulse to the cathode of diodes 151–158 will trigger the gating transistor associated with each non-conducting storage transistor but will not affect the gating transistors associated with the conducting storage transistors. In this manner signals will be generated across the emitter resistors, shown in FIG. 7, of gating transistors 141, 143, 145 and 148, and labeled thereat as resistors 171, 173, 175 and 178.

To digress for a moment, it should be re-emphasized that the gating signals for the gate circuitry of FIG. 6 may be arranged to always be present, in which case lead 159 in FIG. 6 would be held at 0 volts. If this is the case then the accumulation of counter 12, as it is transferred to its storage circuitry will immediately be transferred therefrom to the input leads of the decoding circuitry of FIG. 7.

In the above manner signal inputs to the decoder circuitry will be supplied by the temporary memory of FIG. 6. The generation of signals at resistors 171, 173, 175 and 178 will apply 0 volt to preselected ones of the three groups of transistors which make up the decoder. It should be recalled that although the transistors are arranged in ten unique tandem paths, with each of the paths including three transistors, that normally no current will flow through any of the paths because the transistors are all held in their non-conducting states. Therefore, since no current is flowing through any of the paths none of the ten decimal indicating output lights will be on. However, upon the occurrence of any of the various input patterns as shown in Chart A at the input leads, 161–168, of the decoder predetermined ones of the transistors will be enabled, but in no case will this result in more than one series path being completed to light its associated lamp.

Accordingly, with the example assumed, binary five accumulated in counter 12, the −12 to 0 signals developed across resistors 171, 173, 175 and 178 will apply positive pulses to the base electrodes of transistors 187 of group one, transistors 188, 189, 190 and 191 of group two, and transistors 195, 198, 199 and 201 of group three. However, as a tracing of the circuitry of FIG. 7 will disclose, only those transistors which are part of a series path in which all three of the transistors contained therein are turned on will in fact be enabled. Therefore, only transistors 187, 188 and 199 will in fact be turned on. Transistors 187, 188 and 199 lie in the unique path which indicates decimal digit five, and hence upon the concurrent enabling of the three transistors a current will flow through the series path to light decimal indicating lamp 5. In turn of course this results in the illumination of the plastic output sheet which will display the decimal five.

In the above manner an accumulation of binary information in counters 12, 13 and 14 has been decoded to its equivalent decimal representation. While in this example it has been explained and illustrated how the accumulation of a binary five can be accurately and speedily converted into its decimal equivalent by use of the invention it should of course be apparent that the invention will operate as well with any binary accumulations. Also it should be understood that various changes in details of construction and arrangement of parts may be made by those skilled in the art without departing from the spirit and scope of the invention.

Having described the invention, I claim:

1. A binary to decimal decoding matrix comprising, in combination, three groups of switching elements, each switching element having two current carrying leads and an actuating lead, a binary coded decimal counter accumulating data and manifesting at its output terminals the results of the accumulations, means connecting the current carrying leads of one switching element only from each of said groups into ten decimal indicating paths each containing three switching elements only, and means operatively connecting predetermined output terminals of said counter to predetermined actuating leads of said switching elements to actuate the three switching elements in one of said decimal indicating paths for any given accumulation in said counter.

2. A binary to decimal decoding matrix comprising, in combination, three groups of switching elements, a binary coded decimal counter registering data, means connecting one switching element only from each of said groups into ten decimal indicating series circuit paths each containing three switching elements only, and means operable in response to the registered data in said counter to actuate the three switching elements in one of said ten decimal indicating series paths for any given data registration.

3. A transistor binary to decimal decoder for setting a decimal indicating device in accordance with the binary count accumulated in a binary coded decimal counter comprising, in combination, a first group of switching elements, each switching element including at least two load terminals and a control terminal, a second group of switching elements, each switching element including at least two load terminals and a control terminal, a third group of switching elements, each switching element including at least two load terminals and a control terminal, means for so connecting the load terminals of at least one switching element of each of said groups into series circuit arrangement with the load terminals at least one switching element of each of said other groups that ten unique decimal indicating paths are formed each containing one switching element from each of said three groups only, and means for selectively actuating the control terminals of said switching elements in accordance with the setting of the binary counter and accordingly completing one of said ten decimal indicating paths.

4. A transistor binary to decimal decoding network comprising, in combination, a binary counter having a plurality of output leads representative of the binary coded decimal count therein at any given instant, a first group of switching elements, a second group of switching elements, a third group of switching elements, each of said switching elements of said first, second and third groups being a transistor with at least two current carrying elements and an activating element, means interconnecting the current carrying elements of said transistors into a plurality of series circuit paths, and means connecting the plurality of output leads of said binary counter to predetermined ones of said activating elements, selectively activating a single one of said switching elements in each group to form ten unique decimal indicating series circuit paths in accordance with the count accumulated in said binary counter.

5. A binary to decimal decoding system comprising, in combination a binary coded decimal counter registering the occurrence of data therein, a decoding matrix comprising first, second and third groups of transistor type switching elements, each transistor having two current carrying terminals and one control element, decimal indicating circuitry including means connecting one current carrying terminal of each switching element of said first group to one current carrying terminal of selected ones of said second group of elements, means connecting the other current carrying terminal of each of said second groups of switching elements to one current carrying terminal of selected ones of said third group of elements, a source of operating potential operably connected across the remaining heretofore unconnected current carrying terminals of said first and third groups, and means for actuating preselected ones of said control elements to complete only one decminal indicating circuit in accordance with the number in said counter.

References Cited by the Examiner

UNITED STATES PATENTS

| | | | |
|---|---|---|---|
| 2,738,499 | 3/1956 | Sprick | 340—347 |
| 2,761,620 | 9/1956 | Lindesmith et al. | 235—155 |
| 2,872,114 | 2/1959 | Wilson | 340—347 |
| 2,953,777 | 9/1960 | Gridley | 340—347 |
| 2,975,410 | 3/1961 | Grow | 340—347 |
| 3,077,589 | 2/1963 | Loudon | 340—347 |

MAYNARD R. WILBUR, *Primary Examiner.*

MALCOLM MORRISON, DARYL W. COOK, ROBERT C. BAILEY, *Examiners.*

W. J. KOPACZ, *Assistant Examiner.*